(12) United States Patent
Guan et al.

(10) Patent No.: US 8,743,829 B2
(45) Date of Patent: Jun. 3, 2014

(54) METHOD AND DEVICE FOR ESTABLISHING OR MODIFYING LOCAL IP ACCESS BEARER

(75) Inventors: Zhi Guan, Shenzhen (CN); Guoqiao Chen, Beijing (CN); Rui Wang, Beijing (CN); Juan Liu, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 106 days.

(21) Appl. No.: 13/432,876

(22) Filed: Mar. 28, 2012

(65) Prior Publication Data

US 2012/0182972 A1 Jul. 19, 2012

Related U.S. Application Data

(63) Continuation of application No. PCT/CN2010/077412, filed on Sep. 28, 2010.

(30) Foreign Application Priority Data

Sep. 28, 2009 (CN) .......................... 2009 1 0177266

(51) Int. Cl.
*H04L 12/28* (2006.01)
*H04W 4/00* (2009.01)
*H04W 36/00* (2009.01)

(52) U.S. Cl.
USPC ........... 370/331; 455/436; 455/438; 455/439; 455/443; 370/338; 370/395.52; 370/401

(58) Field of Classification Search
USPC .......... 370/310, 252; 455/436, 438, 439, 443; 709/235
See application file for complete search history.

(56) References Cited

U.S. PATENT DOCUMENTS 8,179,903 B2 * 5/2012 Gupta et al. .................. 370/400
2003/0185172 A1 10/2003 Rue
(Continued)

FOREIGN PATENT DOCUMENTS

CN 1656840 A 8/2005
CN 101374321 A 2/2009
(Continued)

OTHER PUBLICATIONS

Extended European Search Report issued in corresponding European Patent Application No. 10818434.2, mailed Aug. 28, 2012.
(Continued)

*Primary Examiner* — Alpus H Hsu
*Assistant Examiner* — Camquyen Thai
(74) *Attorney, Agent, or Firm* — Brinks Gilson & Lione

(57) ABSTRACT

A method and device for establishing or modifying a local IP access bearer are provided by the embodiments of the present invention, said method includes: a handover request message transmitted by an evolved Node Base station is received, said handover request message carries an evolved Node Base station identifier, said evolved Node Base station identifier is the same as the local packet data network gateway identifier; the local breakout ability of said evolved Node Base station is obtained; according to said evolved Node Base station identifier, the local breakout ability of said evolved Node Base station and the local IP access point name, the local IP access bearer is established or modified between a serving gateway and the local packet data network gateway, said serving gateway is located in the core network or the evolved Node Base station.

13 Claims, 8 Drawing Sheets

(56) References Cited

U.S. PATENT DOCUMENTS

| | | | |
|---|---|---|---|
| 2007/0253359 A1 | 11/2007 | Hall et al. | |
| 2008/0285492 A1* | 11/2008 | Vesterinen | 370/310 |
| 2008/0311911 A1* | 12/2008 | Koodli et al. | 455/436 |
| 2009/0070694 A1* | 3/2009 | Ore et al. | 715/764 |
| 2009/0073995 A1* | 3/2009 | Pandey et al. | 370/401 |
| 2009/0232019 A1* | 9/2009 | Gupta et al. | 370/252 |
| 2009/0268668 A1* | 10/2009 | Tinnakornsrisuphap et al. | 370/328 |
| 2012/0021749 A1 | 1/2012 | Qiu et al. | |

FOREIGN PATENT DOCUMENTS

| | | | |
|---|---|---|---|
| CN | 101374333 A | | 2/2009 |
| CN | 101427546 A | | 5/2009 |
| EP | 2104388 A1 | * | 9/2009 |
| EP | 2159971 A1 | | 3/2010 |
| EP | 2179557 B1 | * | 12/2010 |
| EP | 2273804 A1 | * | 1/2011 |
| EP | 2306772 A1 | * | 4/2011 |
| WO | WO 02/03720 A2 | | 1/2002 |
| WO | WO 2009/034071 A2 | | 3/2009 |
| WO | WO 2010130270 A1 | * | 11/2010 |
| WO | WO 2011035740 A1 | | 3/2011 |

OTHER PUBLICATIONS

International Search Report and Written Opinion of the International Searching Authority issued in corresponding PCT Patent Application No. PCT/CN2010/077412, mailed Jan. 6, 2011.

Qualcomm Europe, "Local IP Access Baseline Solution for EHNB" Agenda Item 7.4.6, 3GPP TSG SA WG2 Meeting #72. Hangzhou, China, Mar. 30-Apr. 3, 2009. TD S2-092308.

NEC, "Architecture Alternative for Local IP Access" Agenda Item 7.4.6, 3GPP TSG SA WG2 Meeting #72. Hangzhou, China, Mar. 30-Apr. 3, 2009. TD S2-091989.

NEC, "Local GW Based Architecture" Agenda Item 9.1, 3GPP TSG SA WG2 Meeting #75. Kyoto, Japan, Aug. 31-Sep. 4, 2009. TD S2-096015.

Nortel et al., "Way Forward for Local Breakout with IMS" Agenda Item 8.8.1, 3GPP TSG SA WG2 Architecture—S2—#57. Beijing, China, Apr. 23-27, 2007. S2-071727.

LTE, "3$^{rd}$ Generation Partnership Project; Technical Specification Group Services and System Aspects; Service Requirements for Home NodeBs and Home eNodeBs" (Release 9) 3GPP TS 22.220. V9.1.1, Jun. 2009.

Search Report issued in corresponding Chinese Patent Application No. 2010102807676, mailed Sep. 24, 2012.

Samsung, "Open Issues and Solution for LIPA Service" Agenda Item 9.1, 3GPP TSG SA WG2 Meeting #73. Sophia-Antipolis, France, Jul. 6-10, 2009. TD S2-094346.

* cited by examiner

METHOD AND DEVICE FOR ESTABLISHING OR MODIFYING LOCAL IP ACCESS BEARER

CROSS-REFERENCE TO RELATED APPLICATIONS

This application is a continuation of International Application No. PCT/CN2010/077412, filed on Sep. 28, 2010, which claims priority to Chinese Patent Application No. 200910177266.2, filed on Sep. 28, 2009, both of which are hereby incorporated by reference in their entireties.

FIELD OF THE INVENTION

The present invention relates to the field of mobile communications technology, and more particularly, relates to a method and a device for establishing or modifying a local IP access bearer.

BACKGROUND OF THE INVENTION

For a HeNB (3G Home eNodeB, 3G Home eNodeB) with local breakout ability, the local breakout bearer is established through the bearer between UE (User Equipment, User Equipment) and HeNB, the bearer between HeNB and L-SGW (Local Serving Gateway, Local Serving Gateway) and the bearer between L-SGW and L-PGW (Local PDN Gateway, Local PDN Gateway). UE will establish a local default bearer during procedures such as attaching, separating, position updating and service requesting, etc.

When UE is located within the coverage area of a HeNB cell, it can enjoy the local breakout service of the HeNB. If UE leaves the coverage area of the HeNB cell, it losses the local breakout ability and only can obtain services via a core network.

Only UEs located within the coverage area of the HeNB cell can obtain the local breakout service of the HeNB. When a UE that is using the local breakout service moves out of the coverage area of the HeNB cell, the local breakout service will be cut off. Thus, for a situation where UE needs to be continuously handed over between HeNB cell and macro-cell when UE frequently and reciprocally moves around the edge of the coverage area of the HeNB cell or when the signal over the coverage area of the HeNB cell is not stable, such discontinuity of the local breakout service will severely affect user's use of the service and thus result in user's poor experience.

SUMMARY OF THE INVENTION

The embodiments of the present invention provide a method and a device for establishing or modifying a local IP access bearer, which can guarantee the continuity of the local breakout service of the HeNB at the time when a UE is handed over between a HeNB cell and a macro-cell.

The technical solution employed by the embodiments of the present invention goes as follows:

A method for establishing or modifying a local IP access bearer, comprising: receiving a handover request message transmitted by an evolved Node Base station, wherein, the handover request message carries an evolved Node Base station identifier, the evolved Node Base station includes a source evolved Node Base station or a target evolved Node Base station, the evolved Node Base station identifier is the same as the identifier of a local packet data network gateway; obtaining local breakout ability of the evolved Node Base station; according to the evolved Node Base station identifier, the local breakout ability of the evolved Node Base station and a local IP access point name, establishing or modifying a local IP access bearer between a serving gateway and the local packet data network gateway, wherein the serving gateway is located in a core network or the evolved Node Base station.

A device for establishing or modifying a local IP access bearer, comprising: a receiving module for receiving a handover request message transmitted by an evolved Node Base station, wherein, the handover request message carries an evolved Node Base station identifier, the evolved Node Base station includes a source evolved Node Base station or a target evolved Node Base station, the evolved Node Base station identifier is the same as the identifier of a local packet data network gateway; an obtaining module for obtaining local breakout ability of the evolved Node Base station; an establishing or modifying module for, according to the evolved Node Base station identifier, the local breakout ability of the evolved Node Base station and a local IP access point name, establishing or modifying a local IP access bearer between a serving gateway and the local packet data network gateway, wherein the serving gateway is located in a core network or the evolved Node Base station.

The embodiments of the present invention provide a method and a device for establishing or modifying a local IP access bearer. When the position of a terminal is handed over, a mobility management entity firstly receives a handover request message transmitted by an evolved Node Base station and the handover request message carries an evolved Node Base station identifier. Then the local breakout ability of the evolved Node Base station is obtained. According to the evolved Node Base station identifier, the local breakout ability of the evolved Node Base station and the local IP access point name, a local IP access bearer is established or modified between the serving gateway and the local packet data network gateway. Compared with the prior art, in a situation where UE needs to be continuously handed over between a HeNB cell and a macro-cell, it is still possible to guarantee the continuity of the local breakout service of HeNB and improve user's experience quality.

BRIEF DESCRIPTION OF THE DRAWINGS

In order to more clearly describe the technical solution in the embodiments of the present invention or the technical solution in the prior art, the drawings that need to be used in the embodiments of the present invention or need to be used in the prior art will be introduced briefly. Obviously, the drawings in the following description are merely some embodiments of the present invention. For one of ordinary skill in the art, it is still possible to obtain other drawings according to these drawing, without paying any creative efforts.

DETAILED DESCRIPTION OF THE EMBODIMENTS

Below, in conjunction with the accompanying drawings of the present invention, the technical solution of the present invention will be clearly and completely described. Obviously, the described embodiments are merely partial embodiments of the present invention, rather than all the embodiments. Based on the embodiments of the present invention, all other embodiments that will be obtained by one of ordinary skill in the art without paying any creative efforts are also within the claimed scope of the present invention.

For making the advantages of the technical solution of the present invention much clearer, the present invention will be described in detail in conjunction with the accompanying drawings and the embodiments.

When the evolved Node Base station and the local packet data network gateway are the same network entity, the evolved Node Base station identifier is the same as the local packet data network gateway identifier, the selection of the local packet data network gateway is based on the evolved Node Base station identifier and what is reported by the evolved Node Base station to the network side is the evolved Node Base station identifier; when the evolved Node Base station and the local packet data network gateway are different network entities, the evolved Node Base station identifier reported by the evolved Node Base station to the network side is replaced by the local packet data network gateway identifier. These are applicable to the following embodiments.

Embodiment One

Figure 1:
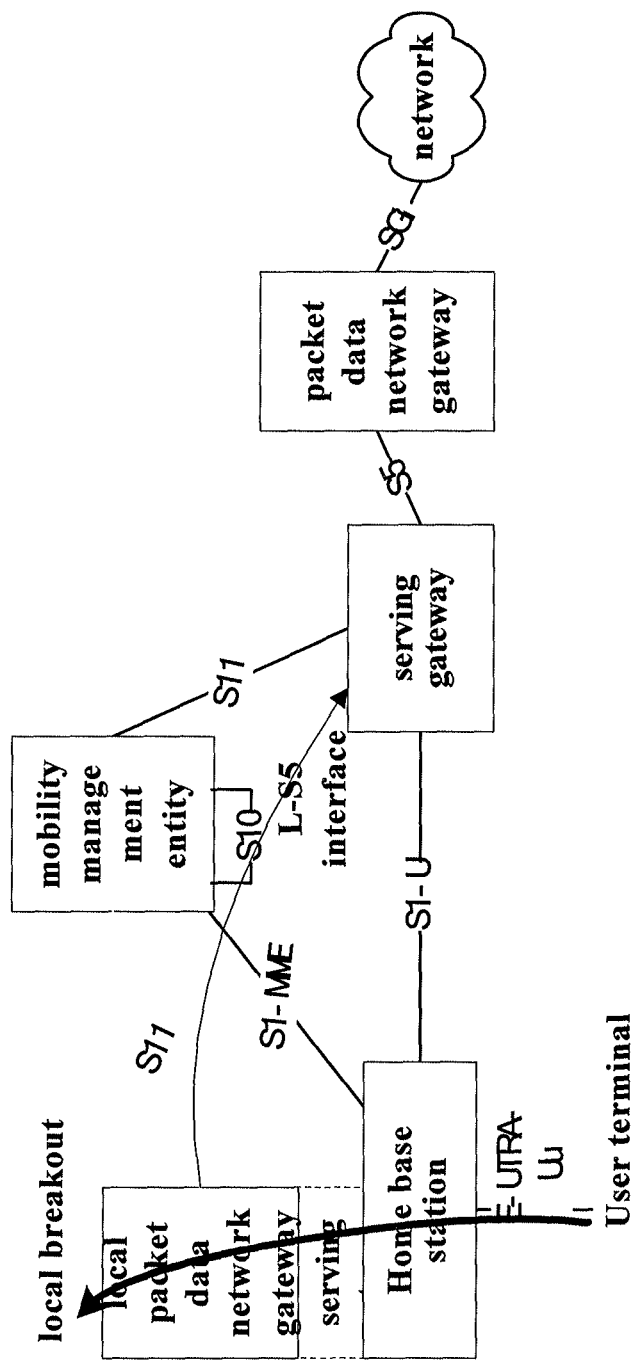
FIG. 1 is a network structural view provided by Embodiment One of the present invention.
Figure 2:
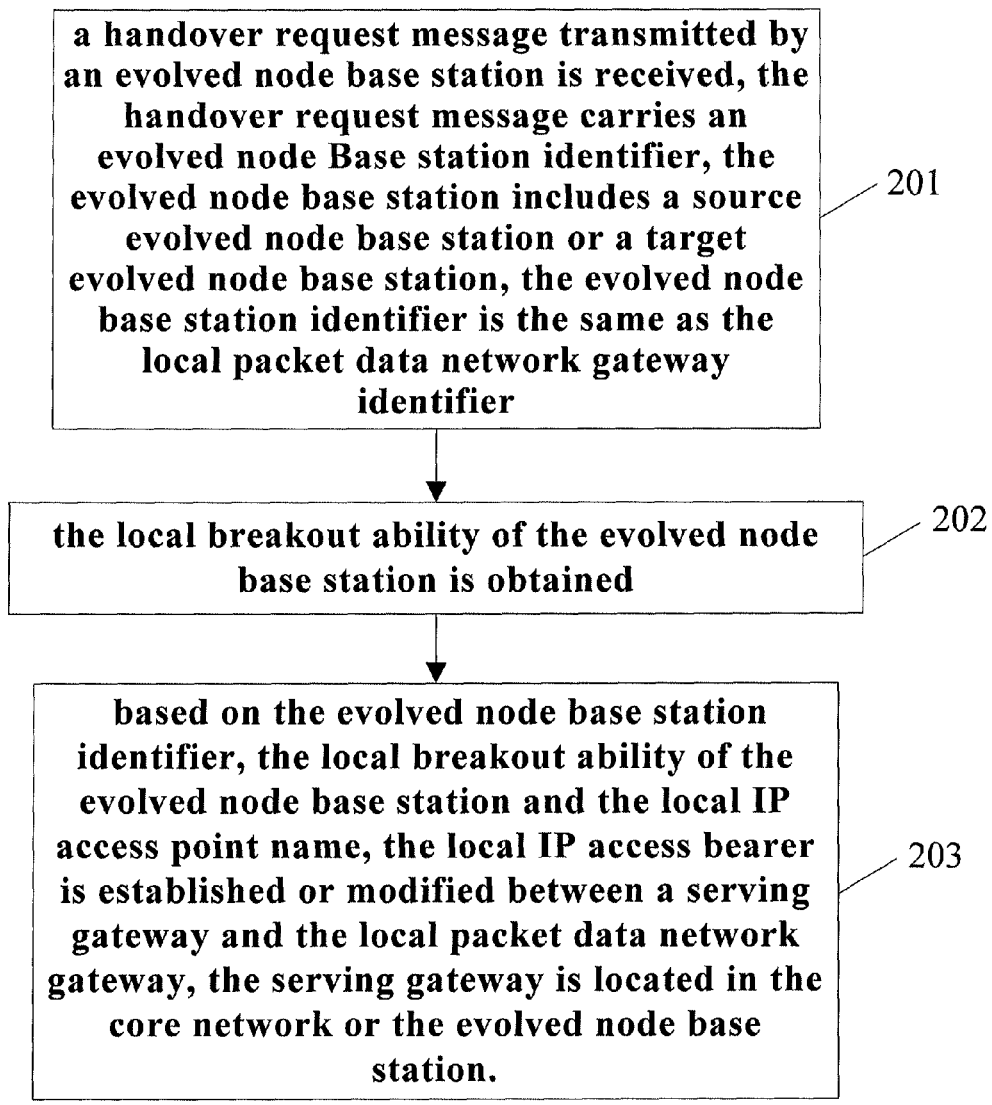
FIG. 2 is a flowchart of the method for establishing or modifying a local IP access bearer provided by Embodiment One of the present invention.

This embodiment provides a method for establishing or modifying a local IP access bearer. As shown in FIG. 1, on the basis of the existing HeNB local breakout architecture, a S5 interface between HeNB local packet data network gateway L-PGW (Local PDN Gateway, Local PDN Gateway) and the core network serving gateway node S-GW (Serving Gateway, Serving Gateway) is added. At the time of updating a bearer, the network updates the bearer to be a bearer between the core network S-GW and the local L-PGW of HeNB, according to the APN (Access Point Name, Access Point Name) for LIPA (Local IP Access, Local IP Access) and the base station identifier HeNB ID indication message, thereby bypassing the core network data to HeNB and ensuring the continuity of the local breakout service. As shown in FIG. 2, the method for establishing or modifying a local IP access bearer comprises:

201. The mobility management entity receives a handover request message transmitted by the evolved Node Base station, wherein, the handover request message carries an evolved Node Base station identifier, the evolved Node Base station includes a source evolved Node Base station or a target evolved Node Base station, and the evolved Node Base station identifier is the same as the identifier of the local packet data network gateway, for example, the evolved Node Base station identifier is the IP address of the local packet data network gateway;

202. The mobility management entity obtains the local breakout ability of the evolved Node Base station;

The mobility management entity can receive a handover request message transmitted by the source evolved Node Base station, the handover request message carries information about the local breakout ability of the source evolved Node Base station, and thus the mobility management entity can obtain the local breakout ability of the source evolved Node Base station.

The mobility management entity also can receive a handover request acknowledge message transmitted by the target evolved Node Base station, the handover request acknowledge message carries information about the local breakout ability of the target evolved Node Base station, and thus the mobility management entity can obtain the local breakout ability of the target evolved Node Base station.

The mobility management entity also can obtain the information about the local breakout ability of the target evolved Node Base station by querying, and thus can obtain the local breakout ability of the target evolved Node Base station.

When the information about the local breakout ability of the target evolved Node Base station is obtained by querying, the mobility management entity firstly transmits a handover request message to the target evolved Node Base station, wherein, the handover request message contains query mark information indicating the target evolved Node Base station to return the local breakout indication information; after receiving the handover request message containing the query mark information, the target evolved Node Base station returns a handover request acknowledge message to the mobility management entity, wherein, the handover request acknowledge message carries the local breakout indication of the target evolved Node Base station, and the local breakout indication indicates the information about the local breakout ability of the target evolved Node Base station;

203. The mobility management entity establishes or modifies a local IP access bearer between the serving gateway and the local packet data network gateway, according to the evolved Node Base station identifier, the local breakout ability of the evolved Node Base station and the local IP access point name, wherein, the serving gateway is located in the core network or the evolved Node Base station;

Wherein, the establishing or modifying a local IP access bearer between the serving gateway and the local packet data network gateway can comprise:

The mobility management entity selects the serving gateway and the local packet data network gateway according to the evolved Node Base station identifier, the local breakout ability of the evolved Node Base station and the local IP access point name, and transmits a modify bearer request message to the selected serving gateway so that the serving gateway transmits the modify bearer request message to the local packet data network gateway and receives a modify bearer response message returned from the local packet data network gateway, and then receives a modify bearer response message returned from the serving gateway, and finally modifies the bearer to be a bearer between the serving gateway and the selected local packet data network gateway.

Wherein, after the mobility management entity has selected the local packet data network gateway, it is further needed to perform a procedure of re-locating the serving gateway so as to re-locate the serving gateway as the local serving gateway of HeNB.

Further, before the mobility management entity receives the handover request message transmitted by the evolved Node Base station, a procedure of establishing a local IP access bearer is further included. Wherein, the procedure of establishing a local IP access bearer may comprise:

selecting the local packet data network gateway and the serving gateway according to the local IP access point name and the HeNB identifier;

transmitting a create or modify bear request message to the serving gateway;

receiving a create or modify bear response message returned from the serving gateway, and completing the procedure of establishing or modifying the bearer between the serving gateway and the local packet data network gateway.

Further, before selecting the local packet data network gateway and the serving gateway according to the local IP access point name and the HeNB identifier, there further comprises:

receiving an attach request message transmitted by a user terminal, wherein the request message carries the local IP access point name; and receiving a forward network access server message by the HeNB, wherein the forward network access server message carriers the HeNB identifier; or, receiving a tracking area update message transmitted by the user terminal, wherein the tracking area update message carries the local IP access point name; and obtaining the HeNB identifier from an allowed closed subscriber group (CSG) list of the user terminal, wherein the HeNB identifier represents a HeNB identifier that can serve as the local IP breakout in the closed subscriber group cells that allow UE's access.

Further, after completing the procedure of establishing or modifying the bearer between the serving gateway and the local packet data network gateway, there further comprises:

transmitting an attach accept message to the user terminal via HeNB, wherein, the attach accept message indicates that the user terminal is authorized a local IP access by the network.

Further, after receiving the tracking area update message transmitted by the user terminal, there further comprises:

determining that the user terminal is authorized to use the local IP access and that there exists a closed subscriber group cell that allows the user terminal's access in the current tracking area where the user terminal resides;

The determining that the user terminal is authorized to use the local IP access comprises:

determining whether the closed subscriber group identifier in the allowed closed subscriber group list of the user terminal is the same as the identifier of the cell in the tracking area;

If they are the same, the tracking area contains the closed subscriber group cell that allows the user terminal's access;

If the closed subscriber group identifier of one or more closed subscriber group cells within the tracking area is included in the allowed closed subscriber group list of the user terminal, a closed subscriber group cell of the high priority is selected;

According to the closed subscriber group identifier in the allowed closed subscriber group list of the user terminal and the local IP access HeNB identifier, the HeNB identifier that establishes a local breakout for the user terminal is obtained.

The embodiments of the present invention provide a method for establishing or modifying a local IP access bearer. When the position of a terminal is handed over, a mobility management entity firstly receives a handover request message transmitted by the evolved Node Base station and the handover request message carries an evolved Node Base station identifier, and then the local breakout ability of the evolved Node Base station is obtained, and according to the evolved Node Base station identifier, the local breakout ability of the evolved Node Base station and the local IP access point name, a local IP access bearer is established or modified between the serving gateway and the local packet data network gateway. Compared with the prior art, in a situation where UE needs to be continuously handed over between a HeNB cell and a macro-cell, it is still possible to guarantee the continuity of the local breakout service of the HeNB and improve user's experience quality.

Below, the method for establishing or modifying a local IP access bearer provided by the embodiments of the present invention will be described in detail in conjunction with particular scenes.

In the embodiments of the present invention, the decision to trigger a relocation via S1 may be Decision to Trigger a relocation via S1, the handover required message may be Handover Required Message, the forward relocation request message may be Forward Relocation Request Message, the handover request message may be Handover Request Message, the handover request acknowledge message may be Handover Request Acknowledge Message, the update bearer request message may be Update Bearer Request Message or modify bearer request message: Modify Bearer Request Message, the update bearer request response message may be Update Bearer Request Response Message or modify bearer response message: Modify Bearer Response Message.

Scene One: HeNB local LIPA bearer establishment

In this scene, the attach request message may be Attach Request Message. The create default bearer request may be Create Default Bearer Request or the create session request message: Create Session Request message. The create default bearer response message may be Create Default Bearer Response message or create session response message: Create Session Response. The initial context setup request message may be Initial Context Setup Request message. The attach accept message may be Attach Accept message. The radio resource control connection reconfiguration message may be RRC Connection Reconfiguration message.

For HeNB local L-SGW and L-PGW, since they are disposed on the HeNB, the L-SGW ID and the L-PGW ID are set to have the same ID as the HeNB (i.e. HeNB ID).

There are two manners for LIPA bearer establishment:

Manner One: UE requests a LIPA service to the core network and the core network establishes a LIPA bearer for the UE that is allowed to execute the LIPA.

Manner Two: the network allows the UE that executes LIPA service to obtain LIPA allow indication information issued by the core network during the attach procedure, when the UE launches LIPA service, the core network establishes LIPA bearer for the UE.

Figure 3:
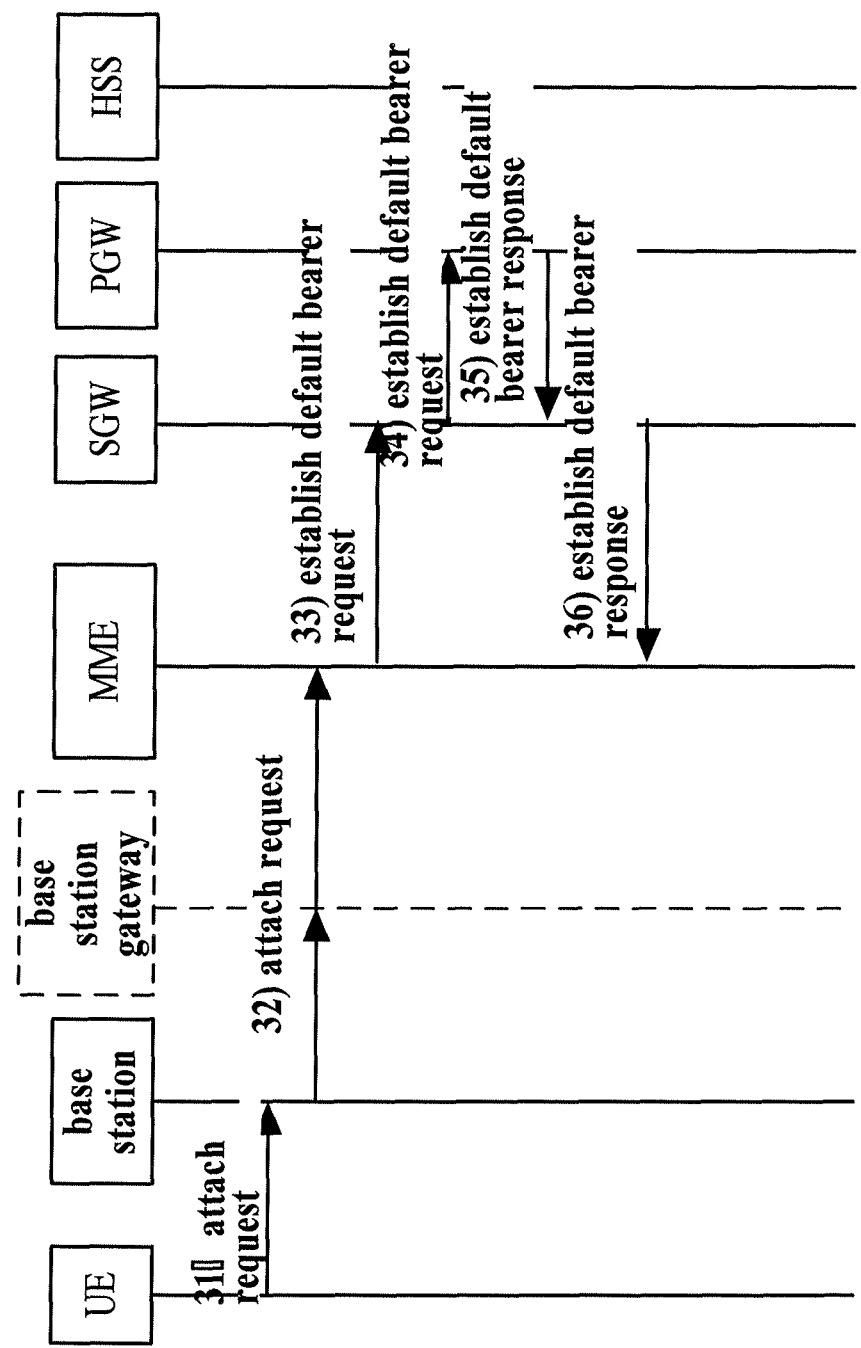
FIG. 3 is a flowchart of the method for establishing or modifying a local IP access bearer in Scene One provided by Embodiment One of the present invention.

As shown in FIG. 3, the method flow of Manner One comprises:

31) UE launches an attach request message to base station. The attach request message carries an APN used for LIPA access and indicates that UE requests HeNB local IP access PDN to the network, as indicated by LIPA APN.

32) The base station obtains a MME (Mobility Management Entity, mobility management entity) according to S-TMSI (temporary mobile subscriber identifier) and the selection of network indication. If the MME cannot be obtained, MME can be selected through the MME selection function. Then, the base station forwards the attach request message to the MME in the S1-MME control signalling, and this message also carries the base station identifier eNB ID and/or the LIPA ability of HeNB, as indicated by LBO Indication (Local Breakout Indication, local breakout indication).

33) If the network allows UE to execute LIPA, LIPA allow subscriber information will be stored in the subscriber information of the UE. MME receives the LIPA request of the UE and LIPA access is determined according to the LIPA subscriber information of the UE and the eNB identifier eNB ID and/or the LIPA ability of HeNB. If allowed, MME selects local L-PGW and L-SGW to the base station according to LIPA APN and eNB ID. MME transmits a create default bearer request message to L-SGW (the create default bearer request message may be Create Default Bearer Request message or Create Session Request).

34) L-SGW creates an entrance in its EPS (Evolved Packet System, evolved packet system) bearer list and sends a create default bearer request message to L-PGW.

35) L-PGW returns a create default bearer response message to L-SGW.

36) L-SGW returns a create default bearer response message to MME.

Thereafter, other attach flows in 23.401 are performed.

Manner Two comprises:

1) UE launches an attach request message to a base station.

2) The base station obtains MME according to S-TMSI and the selection of the network indication. If the MME cannot be obtained, MME can be selected through the MME selection function. Then, the base station forwards the attach request message to the MME in the S1-MME control signalling, and this message also carries eNB identifier eNB ID and/or LIPA ability of HeNB, as indicated by LBO Indication (Local Breakout Indication).

3) If the network allows UE to execute LIPA, LIPA allow subscriber information will be stored in the subscriber information of the UE. MME determines LIPA access according to the LIPA subscriber information of the UE and the LBO.

MME selects an S-GW to transmit a create default bearer request message. If MME determines that LIPA access of UE is allowed, the message carries LIPA allow indication message, which can be indicated as LIPA Indication.

Step 4) to step 8) are the same as the attach procedure in 23.401, and the messages transmitted in these steps all need to carry LIPA indication message (LIPA Indication).

The subsequent UE launches a LIPA service request message to the MME.

With referent to steps 31)-37) in Manner One, the LIPA bearer of the UE is established.

This embodiment is described by taking the attach flow as an example, which is also applicable to service request, position update, and separate flows, and these flows will not be repeated herein.

Scene Two: after relocating to S-GW of the core network, a continuous network architecture of the local breakout is maintained.

On the basis of the HeNB existing local breakout network architecture, an interface L-S5 between S-GW and L-PGW is added. At the time of updating or handing over UE position, the local L-SGW is relocated as the core network S-GW. The network establishes a bearer between the core network S-GW and L-PGW according to the local breakout indication of HeNB -LBO Indication and/or HeNB ID (i.e. L-PGW ID), LIPA APN addressing to HeNB local L-PGW. When UE is handed over from a HeNB cell that allows its access to a non-CSG cell in an active mode, and when HeNB receives downlink LIPA packet, L-PGW will tunnel the packet to the core network S-GW such that it can be ensured that UE can receive the packet data from local HeNB. On the premise that the local breakout continuity cannot be ensured, when UE has already been handed over to a non-CSG cell and there is a downlink LIPA packet arriving at HeNB but HeNB does not know how to transmit this packet, this packet will be tunnelled to PDN GW, and thus this packet is considered as non-LIPA service.

Scene Three: this embodiment mainly relates to a method for ensuring HeNB local breakout continuity after UE moved to a macro-cell from the coverage area of HeNB of the CSG cell that allows UE's access in a CSG scene.

Figure 4:
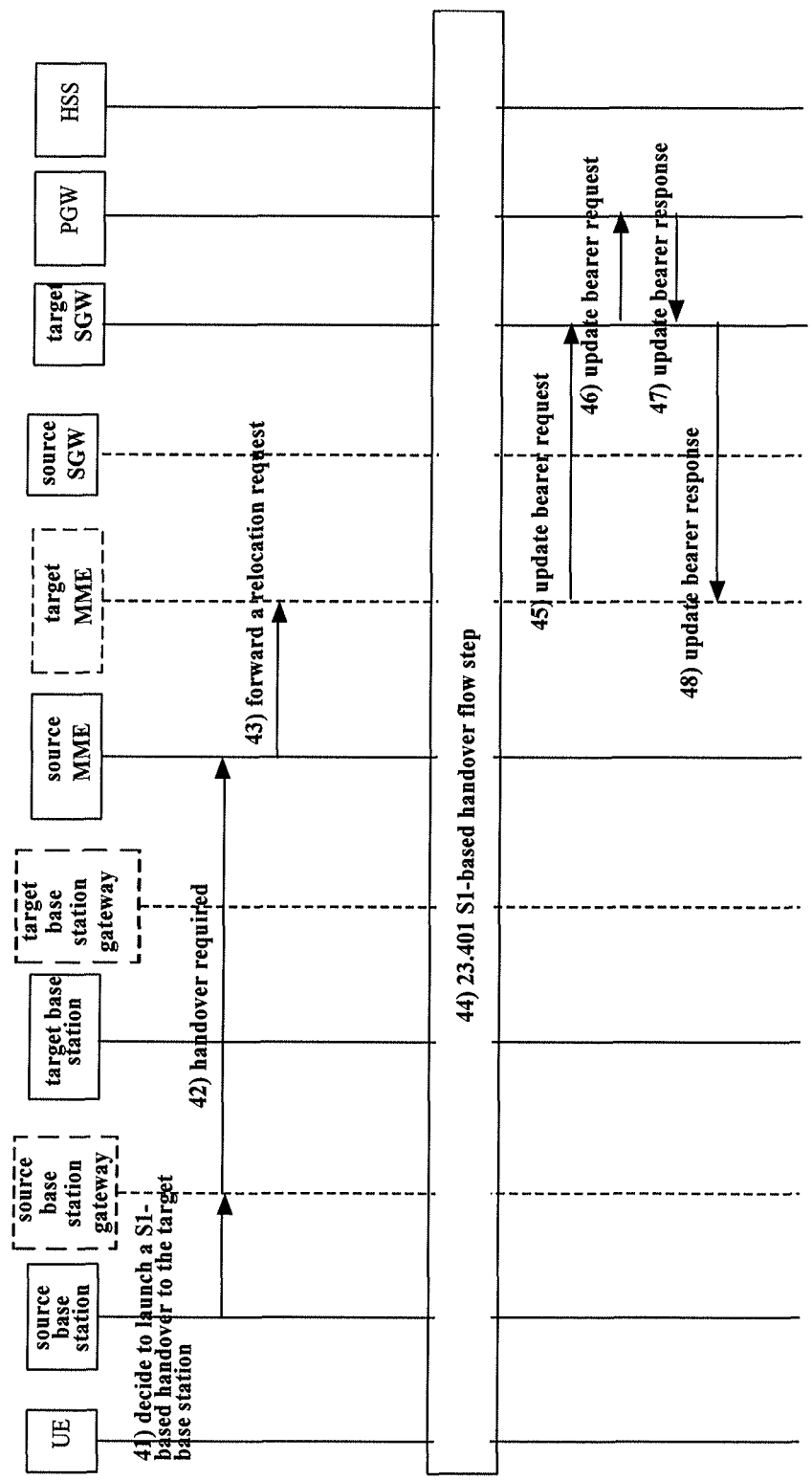
FIG. 4 is a flowchart of the method for establishing or modifying a local IP access bearer in Scene Three provided by Embodiment One of the present invention.

As shown in FIG. 4, this method comprises:

41) The source base station decides to launch a S1-based handover to the target base station.

42) The source base station transmits a handover required message to the source MME. The handover required message can comprise the following parameters: source base station to target base station transparent transmission container, target base station identifier, S1 AP reason, selected position area identifier, or the like. The message carries LBO Indication and eNB ID of the source base station.

43) If it needs to relocate MME, the source MME transmits a forward relocation request message to the target MME. The forward relocation request message can comprise the following parameters: MME UE context, source base station to target base station transparent transmission container, and eNB ID of the target base station.

44) S1-based handover flow steps in 23.401 are performed.

45) MME selects a local PDN GW to the source base station, i.e. L-PGW, according to LIPA APN and eNB ID of the source base station. The local L-SGW of the source base station is relocated as SGW of the core network.

MME sends an update bearer request message to SGW. The update bearer request message contains the following parameters: eNB ID, TEID of EPS bearer that is assigned at the target base station for receiving the downlink service on S1-U, or the like.

46) SGW sends an update bearer request message to L-PGW. After receiving the update bearer request message, L-PGW updates the context thereof.

47) L-PGW returns an update bearer response message to SGW. The update bearer response message comprises the following parameters: PDN GW address, TEID, MSISDN, or the like.

48) SGW sends the update bearer response message to MME. The update bearer response message contains the following parameters: PDN GW address, TEID, or the like.

Through the above procedures, UE is handed over from the source base station to the target base station and the bearer is updated as source base station local LIPA bearer.

Scene Four:

In this scene, when UE enters TA at where the Home base station that allows UE's access is located, the network establishes a local IP breakout bearer between the core network S-GW and the home base station local L-PGW for the UE, and thus the continuity of the local breakout service at the time when UE moves within the TA can be ensured.

This embodiment is mainly described according to two steps. Firstly, during position update procedure, the network makes a determination, so as to establish a local breakout bearer for UE; secondly, when UE is handed over from a macro-cell to a cell covered by a home base station, a local breakout bearer update procedure begins.

1. Establishment of Local Breakout Bearer for UE During TAU Procedure

If MME relocation does not occur before and after the handover, the steps between the source MME and the target MME can be omitted, the source MME and the target MME are the same MME.

If SGW relocation does not occur before and after the handover, the steps between the source SGW and the target SGW can be omitted, the source MME and the target SGW are the same SGW.

The procedure for triggering position update can be: Trigger to start TAU procedure. TAU request message can be: TAU Request message. Create bearer request message can be: Create Bearer Request message, or create session message: Create Session Request message. Update bearer request message can be: Update Bearer Request message or modify bearer request message: Modify Bearer Request message. Update bearer response message can be: Update Bearer Response message or modify bearer response message: Modify Bearer Response message. Create bearer response message can be: Create Bearer Response message or create session response message: Create Session Response message.

Here, in order that the network can find an home base station containing L-PGW, it needs to add an home base station identifier (i.e. HeNB ID) that can serve as a local breakout within the CSG cell that allows UE's access to the ACL of the UE, indicated by LIPA HeNB ID.

Figure 5:
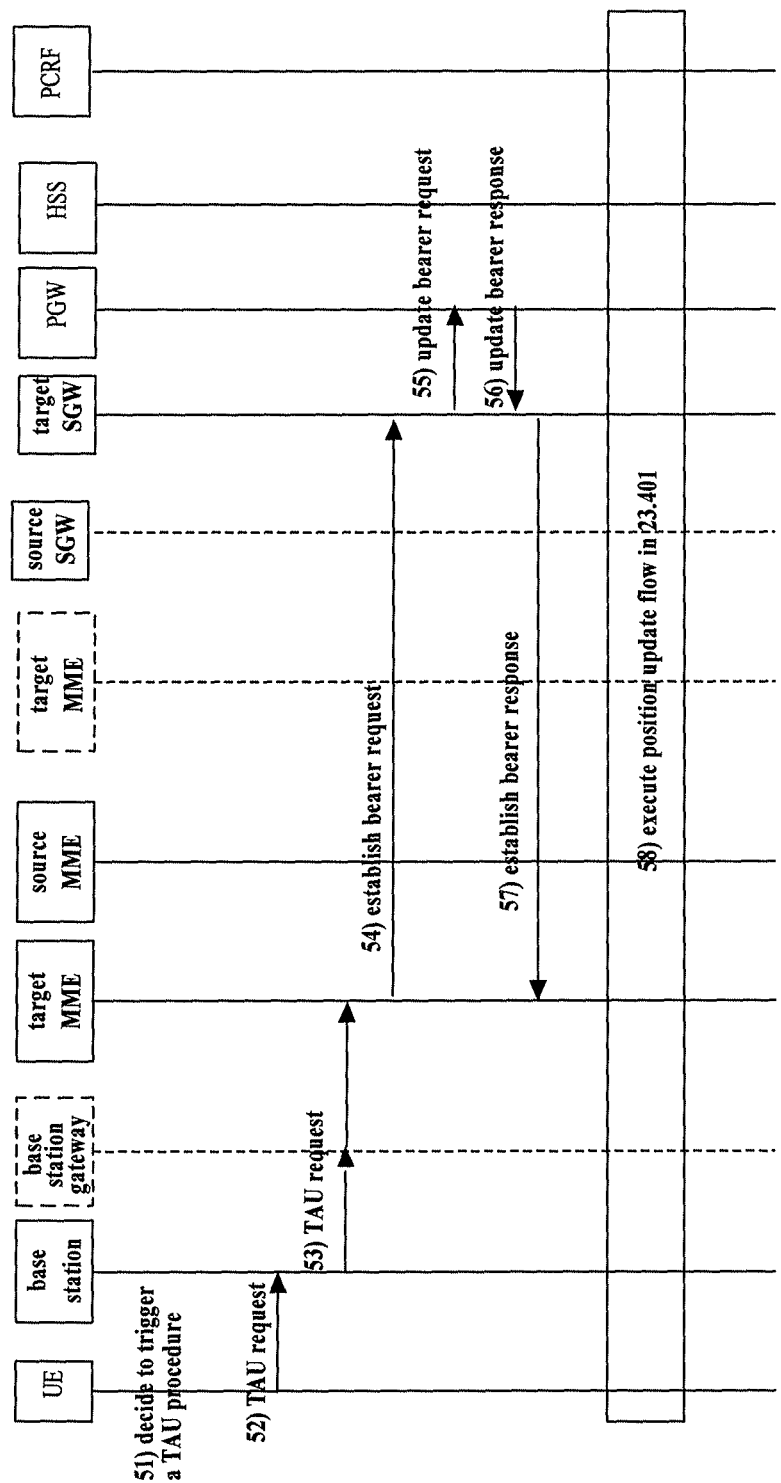
FIG. 5 is a flowchart of the method for establishing or modifying a local IP access bearer in Scene Four provided by Embodiment One of the present invention.

As shown in FIG. 5, the method comprises:

51) Decide to trigger a TAU procedure.

52) UE sends a TAU request message to the base station. The TAU request message can comprise the following parameters: the core network ability of UE, last accessed TAI, activation identifier, EPS bearer status, or the like. The TAU request message carries LIPA APN.

53) The base station forwards the TAU request message of UE to the target MME.

54) After MME has received the TAU request message of UE, two steps of determination are needed. Firstly, it is determined whether or not the network allows the LIPA service requested by the UE. This determination method is similar as the determination method in the procedure of establishing a local default bearer.

Secondly, it is determined whether or not the TA at where UE is currently located has a CSG cell that allows UE's access. The determination method goes as follows: MME determines whether or not the CSG ID in the ACL of the UE is the same as the CSG ID in the cell ID (Cell ID) of the cell under the TA. If they are the same, it means that this TA contains a CSG cell that allows UE's access. If MME determines that the CSG ID of more than one CSG cell under the TA is included in the ACL of UE, a CSG cell of the high priority is selected according to the order of priority. Thereafter, MME obtains a HeNB ID that can establish a local breakout for the UE, according to the CSG ID and LIPA HeNB ID in the ACL of the UE.

MME selects an L-PGW on the HeNB that allows UE's access and can serve as a local IP breakout, according to HeNB ID and LIPA APN.

MME selects an S-GW to send a create bearer request message. This create bearer request message can comprise the following parameters: IMSI, bearer context, MME address and TEID, type or the like.

55) S-GW sends an update bearer request message to the L-PGW selected by MME. The update bearer request message can comprise the following parameters: S-GW address and TEID, RAT type and the like.

56) L-PGW returns an update bearer response message to S-GW. The update bearer response message can comprise the following parameters: MSISDN, PDN GW address, TEID and the like.

57) S-GW returns a create bearer response message to MME. The create bearer response message can comprise the following parameters: S-GW address and TEID, or the like.

58) The position update flow in 23.401 is performed.

Through the above procedures, LIPA bearer between the core network S-GW to home base station local L-PGW is established for UE.

2. The Handover Procedure in which UE is Handed over from a Macro-cell to HeNB Cell.

Figure 6:
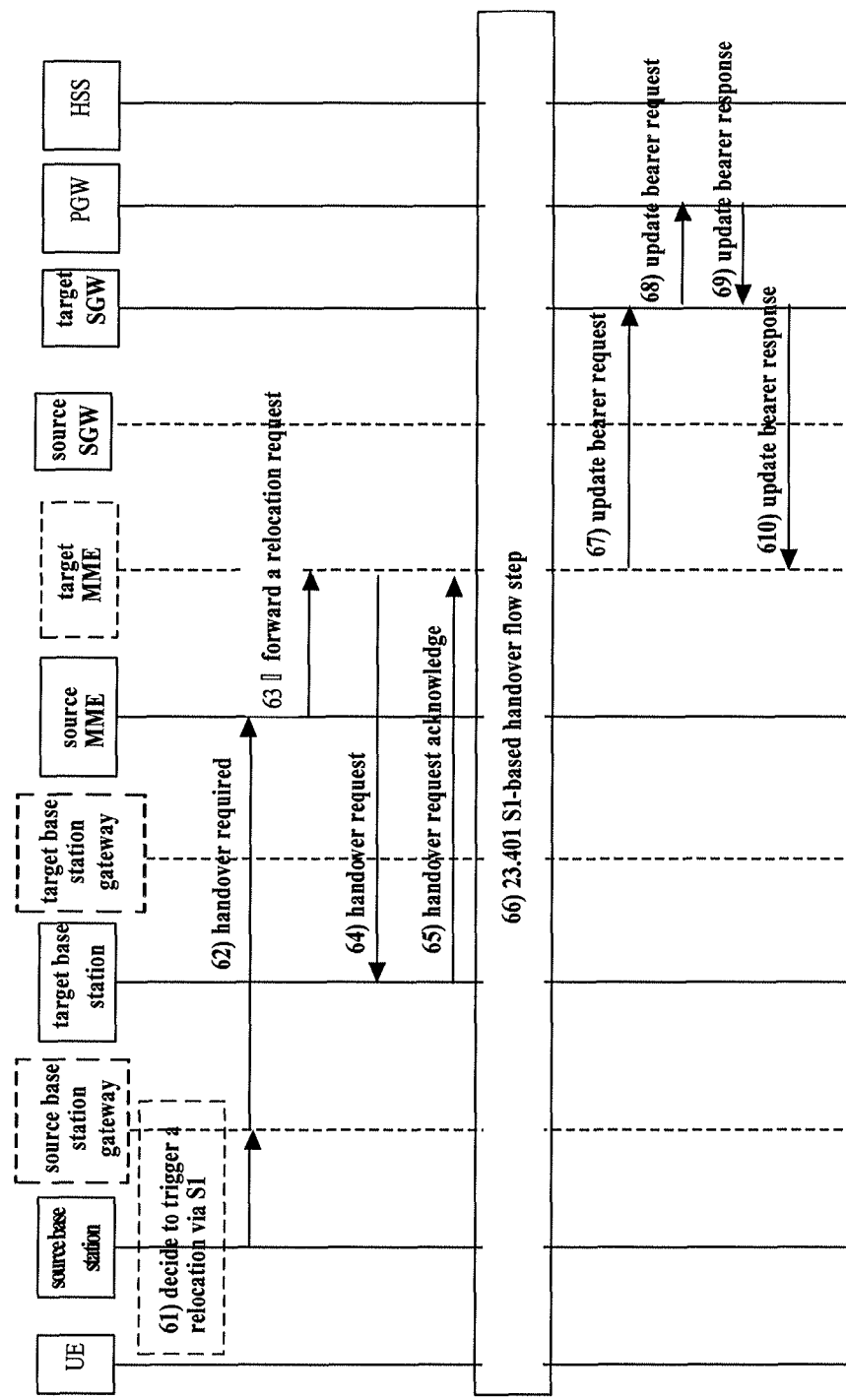
FIG. 6 is another flowchart of the method for establishing or modifying a local IP access bearer in Scene Four provided by Embodiment One of the present invention.

As shown in FIG. 6, the method comprises:

61) The source base station decides to launch a S1-based handover to the target base station.

62) The source base station sends a handover required message to the source MME. The handover required message can comprise the following parameters: source base station to target base station transparent transmission container, target base station identifier, S1 AP reason, selected position area identifier, or the like.

63) If it needs to relocate MME, the source MME transmits a forward relocation request message to the target MME. The forward relocation request message can comprise the following parameters: MME UE context, source base station to target base station transparent transmission container, and eNB ID.

64) The target MME sends a handover request message to the target base station. The handover request message can comprise the following parameters: EPS bearer to be established, AMBR, S1 AP reason, source base station to target base station transparent transmission container, handover constriction list, or the like. This handover request message carries a query mark of the local breakout ability indication information of the base station, as indicated by LBO Required Indication.

65) The target base station sends a handover request acknowledge message to the target MME. The handover request acknowledge message can comprise the following parameters: EPS bearer establishment result, target base station to source base station transparent transmission container, or the like. The Handover Request Acknowledge message carries local breakout ability indication information, as indicated by LBO Indication. LBO Indication does not have to go through the query procedure of step 4), but is carried in the message itself and then sent to the target MME.

66) S1-based handover flow step in 23.401 is performed.

67) MME selects a local PDN GW on the target base station, i.e. L-PGW, according to LIPA APN and eNB ID. S-GW is relocated from the core network as the local L-SGW of the target base station.

MME sends an update bearer request message to L-SGW. The update bearer request message contains the following parameters: eNB ID, TEID of EPS bearer that is assigned at the target base station for receiving the downlink service on S1-U, or the like.

68) L-SGW sends an update bearer request message to L-PGW. After the update bearer request message has been received, L-PGW updates the context thereof.

69) L-GSW returns an update bearer response message to L-SGW. The update bearer response message comprises the following parameters: PDN GW address, TEID, MSISDN, or the like.

610) L-SGW sends an update bearer response message to MME. The update bearer response message comprises the following parameters: PDN GW address, TEID, or the like.

Through the above procedures, UE is handed over from the source base station to the target base station and the bearer is updated as the local LIPA bearer of the target base station.

The embodiments of the present invention provide a method for establishing or modifying a local IP access bearer. When the position of a terminal is handed over, a mobility management entity firstly receives a handover request message transmitted by the evolved Node Base station and the handover request message carries an evolved Node Base station identifier, and then the local breakout ability of the evolved Node Base station is obtained, and according to the evolved Node Base station identifier, the local breakout ability of the evolved Node Base station and the local IP access point name, a local IP access bearer is established or modified between the serving gateway and the local packet data network gateway. Compared with the prior art, in a situation where UE needs to be continuously handed over between HeNB cell and macro-cell, it is still possible to guarantee the continuity of the local breakout service of HeNB and improve user's experience quality.

Embodiment Two

Figure 7:
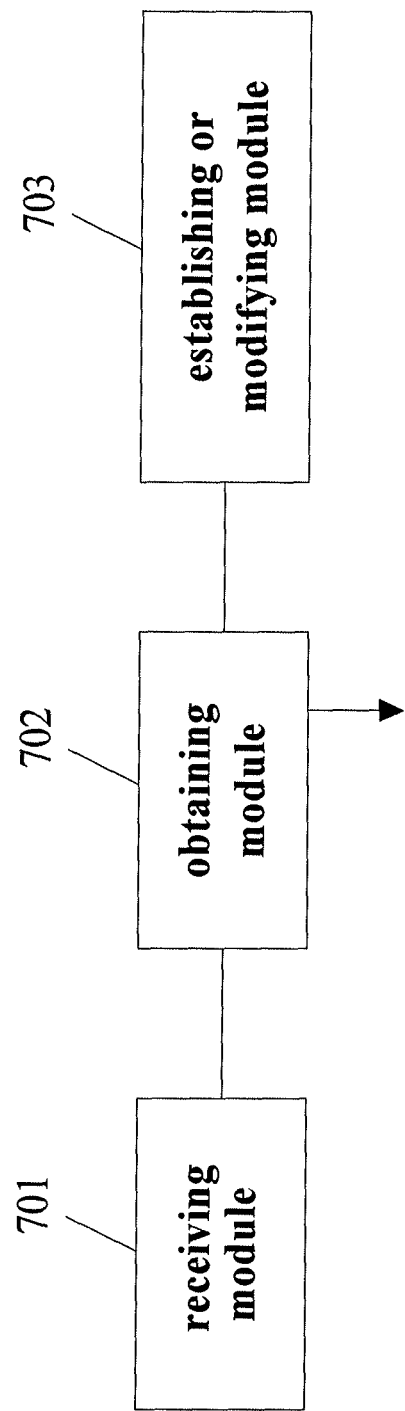
FIG. 7 is a schematic diagram of the configuration of the device for establishing or modifying a local IP access bearer provided by Embodiment Two of the present invention.

The embodiments of the present invention provide a device for establishing or modifying a local IP access bearer, as shown in FIG. 7. The device comprises:

a receiving module 701 for receiving a handover request message transmitted by an evolved Node Base station, wherein, the handover request message carries an evolved Node Base station identifier, the evolved Node Base station includes a source evolved Node Base station or a target evolved Node Base station, the evolved Node Base station identifier is the same as a local packet data network gateway identifier;

an obtaining module 702 for obtaining local breakout ability of the evolved Node Base station;

an establishing or modifying module 703 for, according to the evolved Node Base station identifier, the local breakout ability of the evolved Node Base station and a local IP access point name, establishing or modifying a local IP access bearer between a serving gateway and the local packet data network gateway, wherein the serving gateway is located in a core network or the evolved Node Base station.

The embodiments of the present invention provide a device for establishing or modifying a local IP access bearer. When the position of a terminal is handed over, a mobility management entity firstly receives a handover request message transmitted by the evolved Node Base station and the handover request message carries an evolved Node Base station identifier, and then the local breakout ability of the evolved Node Base station is obtained, and according to the evolved Node Base station identifier, the local breakout ability of the evolved Node Base station and the local IP access point name, a local IP access bearer is established or modified between the serving gateway and the local packet data network gateway. Compared with the prior art, in a situation where UE needs to be continuously handed over between HeNB cell and macro-cell, it is still possible to guarantee the continuity of the local breakout service of HeNB and improve user's experience quality.

Embodiment Three

Figure 8:
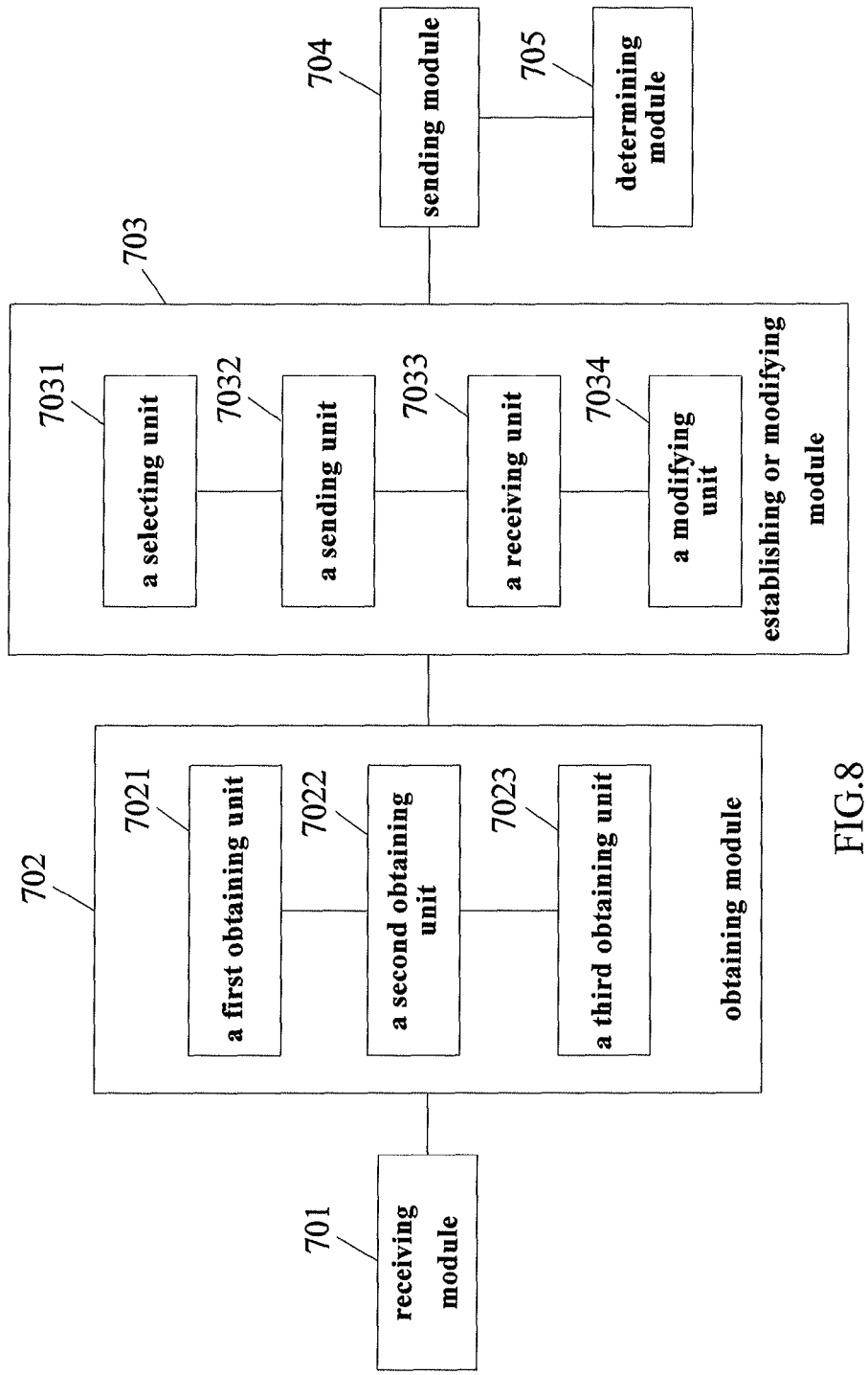
FIG. 8 is a schematic diagram of the configuration of the device for establishing or modifying a local IP access bearer provided by Embodiment Three of the present invention.

The embodiments of the present invention provide a device for establishing or modifying a local IP access bearer, as shown in FIG. 8. The device comprises:

a receiving module 701 for receiving a handover request message transmitted by an evolved Node Base station, wherein, the handover request message carries an evolved Node Base station identifier, the evolved Node Base station includes a source evolved Node Base station or a target evolved Node Base station, the evolved Node Base station identifier is the same as a local packet data network gateway identifier;

an obtaining module 702 for obtaining local breakout ability of the evolved Node Base station;

an establishing or modifying module 703 for, according to the evolved Node Base station identifier, the local breakout ability of the evolved Node Base station and a local IP access point name, establishing or modifying a local IP access bearer between a serving gateway and the local packet data network gateway, wherein the serving gateway is located in a core network or the evolved Node Base station.

Wherein, the obtaining module 702 at least comprises any one of the following units:

a first obtaining unit 7021, for obtaining information about the local breakout ability of the source evolved Node Base station according to the handover request message received by the receiving module 701 and transmitted by the evolved Node Base station;

a second obtaining unit 7022, for receiving a handover request acknowledge message transmitted by the target evolved Node Base station, and according to the handover request acknowledge message, obtaining the local breakout ability of the target evolved Node Base station, wherein, the handover request acknowledge message carries information about the local breakout ability of the target evolved Node Base station;

a third obtaining unit 7023, for obtaining the information about the local breakout ability of the target evolved Node Base station by querying.

Wherein, the establishing or modifying module 703 comprises:

a selecting unit 7031, for selecting the serving gateway and the local packet data network gateway according to the evolved Node Base station identifier, the local breakout ability of the evolved Node Base station and the local IP access point name;

a sending unit 7032, for sending a modify bearer request message to the selected serving gateway, such that the serving gateway sends the modify bearer request message to the local packet data network gateway and receives the modify bearer response message returned from the local packet data network gateway;

a receiving unit 7033, for receiving the modify bearer response message returned from the serving gateway;

a modifying unit 7034, for modifying the bearer to be a bearer between the core network serving gateway and the selected local packet data network gateway, when the receiving module 701 receives the modify bearer response message returned from the serving gateway.

Wherein, the device further comprises:

a sending module 704, for sending an attach accept message to the user terminal via a home base station, wherein, the attach accept message indicates that the user terminal is authorized with local IP access by the network.

Wherein, after the sending module 704 sends the attach accept message to the user terminal via the home base station, the receiving module 701 is further used for receiving an attach request message or a tracking area update message transmitted by the user terminal, wherein the attach request message or the tracking area update message carries the local IP access point name.

Wherein, the device further comprises:

a determining module 705, for determining that the user terminal is authorized to use local IP access and that there exists a closed subscriber group cell that allows the user terminal's access in the current tracking area where the user terminal resides;

the determining module 705 is particularly used for determining whether the closed subscriber group identifier in the allowed closed subscriber group list of the user terminal is the same as the cell identifier in the tracking area; if they are the same, the tracking area contains the closed subscriber group cell that allows the user terminal's access; if the closed subscriber group identifier of one or more closed subscriber group cell within the tracking area is included in the allowed closed subscriber group list of the user terminal, a closed subscriber group cell of the high priority is selected;

Thereafter, according to the closed subscriber group identifier in the allowed closed subscriber group list of the user terminal and the local IP access home base station identifier, the determining module 705 obtains the home base station identifier that establishes a local breakout for the user terminal.

The embodiments of the present invention provide a device for establishing or modifying a local IP access bearer. When the position of a terminal is handed over, a mobility management entity firstly receives a handover request message transmitted by the evolved Node Base station and the handover request message carries an evolved Node Base station identifier, and then the local breakout ability of the evolved Node Base station is obtained, and according to the evolved Node Base station identifier, the local breakout ability of the evolved Node Base station and the local IP access point name, a local IP access bearer is established or modified between the serving gateway and the local packet data network gateway. Compared with the prior art, in a situation where UE needs to be continuously handed over between HeNB cell and macro-cell, it is still possible to guarantee the continuity of the local breakout service of HeNB and improve user's experience quality.

The embodiments of the present invention are applicable to EPS system but not limited to this, and are also applicable to other mobile communications systems such as UMTS (Universal Mobile Telecommunication System, Universal Mobile Telecommunication System).

It needs to point out that, the base station in the EPS system is an evolution of the base station in the UMTS system, and thus is called as evolved Node Base station eNB. In this embodiment, NB and eNB both are referred as base station.

Home base station is a small-size base station and the following schemes applicable to base station are also applicable to the home base station.

It should be noted that, in Embodiment One of the present invention, when the serving gateway is located in the core network, the terminal does not need to perform relocation of serving gateway during the handover procedure and meanwhile data route of local IP access service is implemented through a direct channel between the base station and the local packet data network gateway.

In Embodiment One of the present invention, the situation of establishing or modifying a local IP access bearer with the home base station being used as the local IP breakout is described as an example.

In Embodiment One of the present invention, in a situation where SGW is set on the core network and L-PGW is configured on HeNB, L-PGW ID and HeNB ID are the same.

One of ordinary skill in the art can understand that, the entire or partial flow of the aforementioned method embodiment can be realized by a relevant hardware instructed through computer programs; the programs can be stored in a computer readable storage medium and can comprise the flow of the aforementioned method embodiment when being executed. Wherein, the storage medium can be a magnetic disc, an optical disc, a Read-Only Memory (Read-Only Memory, ROM) or a Random Access Memory (Random Access Memory, RAM), or the like.

The embodiments of the present invention have been described above, but the claimed scope of the present invention is not limited to these embodiments. One of ordinary skill in the art can easily conceive other modifications or replacements within the technical scope disclosed by the present invention, and these modifications and replacements are all within the claimed scope of the present invention. Therefore, the claimed scope of the present invention is defined by the attached claims.

What is claimed is:

1. A method for establishing or modifying a local Internet Protocol (IP) access bearer, the method comprising:

receiving a handover request message transmitted by an evolved Node Base station, wherein, said handover request message carries an evolved Node Base station identifier, said evolved Node Base station includes a source evolved Node Base station or a target evolved Node Base station, said evolved Node Base station identifier is the same as a local packet data network gateway identifier;

obtaining the local breakout ability of said evolved Node Base station;

according to said evolved Node Base station identifier, the local breakout ability of said evolved Node Base station and a local IP access point name, establishing or modifying a local IP access bearer between a serving gateway and the local packet data network gateway, wherein said serving gateway is located in a core network or the evolved Node Base station;

before receiving the handover request message transmitted from said evolved Node Base station, establishing a local IP access bearer, wherein establishing a local IP access bearer comprises:

selecting the local packet data network gateway and the serving gateway, according to the local IP access point name and the home base station identifier;

sending a create or modify bearer request message to said serving gateway;

receiving a create or modify bearer response message returned from said serving gateway, and completing the procedure of establishing or modifying bearer between said serving gateway and the local packet data network gateway, before selecting the local packet data network gateway and the serving gateway according to the local IP access point name and the home base station identifier, the method comprises:

receiving a tracking area update message transmitted by the user terminal, wherein said tracking area update message carries said local IP access point name;

obtaining said home base station identifier from an allowed closed subscriber group list of the user terminal, wherein said home base station identifier represents a home base station identifier that can serve as the local IP breakout in the closed subscriber group cells that allow the UE's access;

according to said local IP access point name and said base station identifier, selecting the serving gateway and the local packet data network gateway, and sending the create or modify bearer request message to said serving gateway; and receiving the create or modify bearer response message returned from said serving gateway, and completing the procedure of establishing or modifying a local IP access bearer between said serving gateway and said local packet data network gateway.

2. The method of claim 1, wherein:

when said evolved Node Base station is a source evolved Node Base station, said obtaining the local breakout ability of said evolved Node Base station comprises:

obtaining information about the local breakout ability of said source evolved Node Base station from the handover request message transmitted by said source evolved Node Base station;

when said evolved Node Base station is a target evolved Node Base station, said obtaining the local breakout ability of said target evolved Node Base station comprises:

receiving a handover request acknowledge message transmitted by said target evolved Node Base station, wherein said handover request acknowledge message carries information about the local breakout ability of said target evolved Node Base station; or, obtaining information about the local breakout ability of said target evolved Node Base station by querying.

3. The method of claim 2, wherein, said obtaining information about the local breakout ability of said target evolved Node Base station by querying comprises:

transmitting the handover request message to the target evolved Node Base station;

receiving the handover request acknowledge message returned from the target evolved Node Base station, wherein said handover request acknowledge message carries a local breakout indication of the target evolved Node Base station and said local breakout indication indicates the information about the local breakout ability of the target evolved Node Base station.

4. The method of claim 1, wherein, said establishing or modifying a local IP access bearer between the serving gateway and the local packet data network gateway comprises:

selecting the serving gateway and the local packet data network gateway according to said evolved Node Base station identifier, the local breakout ability of said evolved Node Base station and the local IP access point name;

sending a modify bearer request message to the selected serving gateway, so that said serving gateway sends the modify bearer request message to said local packet data network gateway and receives a modify bearer response message returned from said local packet data network gateway;

receiving the modify bearer response message returned from said serving gateway;

modifying the bearer to be a bearer between said serving gateway and the selected local packet data network gateway.

5. The method of claim 4, wherein, after selecting the local packet data network gateway, the method further comprises:

relocating the serving gateway to a local serving gateway of a home base station.

6. The method of claim 1, wherein, after completing the procedure of establishing or modifying bearer between said serving gateway and the local packet data network gateway, the method further comprises:

transmitting an attach accept message to the user terminal via the home base station, wherein, said attach accept message indicates that said user terminal is authorized a local IP access by the network.

7. The method of claim 1, wherein, after receiving the tracking area update message transmitted by the user terminal, the method further comprises:

determining that said user terminal is authorized to use the local IP access and that there exists a closed subscriber group cell that allows said user terminal's access in the current tracking area where said user terminal resides;

said determining that said user terminal is authorized to use the local IP access comprises:

determining whether the closed subscriber group identifier in the allowed closed subscriber group list of said user terminal is the same as the cell identifier in said tracking area;

if they are the same, said tracking area contains the closed subscriber group cell that allows said user terminal's access;

if the closed subscriber group identifier of one or more closed subscriber group cell within said tracking area is included in the allowed closed subscriber group list of said user terminal, a closed subscriber group cell of high priority is selected; according to the closed subscriber group identifier in the allowed closed subscriber group list of said user terminal and home base station identifier of the local IP access, the home base station identifier that establishes a local breakout for said user terminal is obtained.

8. A method for establishing or modifying a local Internet Protocol (IP) access bearer, the method comprising:

receiving a handover request message transmitted by an evolved Node Base station, wherein, said handover request message carries an evolved Node Base station identifier, said evolved Node Base station includes a source evolved Node Base station or a target evolved Node Base station, said evolved Node Base station identifier is the same as a local packet data network gateway identifier;

obtaining the local breakout ability of said evolved Node Base station;

according to said evolved Node Base station identifier, the local breakout ability of said evolved Node Base station and a local IP access point name, establishing or modifying a local IP access bearer between a serving gateway and the local packet data network gateway, wherein said serving gateway is located in a core network or the evolved Node Base station, wherein, before receiving the handover request message transmitted from said evolved Node Base station, the method further comprises a procedure of establishing a local IP access bearer, said establishing a local IP access bearer particularly comprises:

selecting the local packet data network gateway and the serving gateway, according to the local IP access point name and the home base station identifier;

sending a create or modify bearer request message to said serving gateway;

receiving a create or modify bearer response message returned from said serving gateway, and completing the procedure of establishing or modifying bearer between said serving gateway and the local packet data network gateway, wherein, before selecting the local packet data network gateway and the serving gateway according to the local IP access point name and the home base station identifier, the method further comprises:

receiving an attach request message transmitted by the user equipment and forwarded in S1-Mobility Management Entity (S1-MME) control signaling by the receiving base station, said attach request message carries the local IP access point name, and said S1-MME control signaling carries base station identifier.

9. The method of claim 8 wherein:
when said evolved Node Base station is a source evolved Node Base station, said obtaining the local breakout ability of said evolved Node Base station comprises:
obtaining information about the local breakout ability of said source evolved Node Base station from the handover request message transmitted by said source evolved Node Base station;
when said evolved Node Base station is a target evolved Node Base station, said obtaining the local breakout ability of said target evolved Node Base station comprises:
receiving a handover request acknowledge message transmitted by said target evolved Node Base station, wherein said handover request acknowledge message carries information about the local breakout ability of said target evolved Node Base station; or,
obtaining information about the local breakout ability of said target evolved Node Base station by querying.

10. The method of claim 9, wherein, said obtaining information about the local breakout ability of said target evolved Node Base station by querying comprises:
transmitting the handover request message to the target evolved Node Base station;
receiving the handover request acknowledge message returned from the target evolved Node Base station, wherein said handover request acknowledge message carries a local breakout indication of the target evolved Node Base station and said local breakout indication indicates the information about the local breakout ability of the target evolved Node Base station.

11. The method of claim 8, wherein, said establishing or modifying a local IP access bearer between the serving gateway and the local packet data network gateway comprises:
selecting the serving gateway and the local packet data network gateway according to said evolved Node Base station identifier, the local breakout ability of said evolved Node Base station and the local IP access point name;
sending a modify bearer request message to the selected serving gateway, so that said serving gateway sends the modify bearer request message to said local packet data network gateway and receives a modify bearer response message returned from said local packet data network gateway;
receiving the modify bearer response message returned from said serving gateway;
modifying the bearer to be a bearer between said serving gateway and the selected local packet data network gateway.

12. The method of claim 11, wherein, after selecting the local packet data network gateway, the method further comprises:
relocating the serving gateway to a local serving gateway of a home base station.

13. A method for establishing or modifying a local Internet Protocol (IP) access bearer, the method comprising:
receiving a handover request message transmitted by an evolved Node Base station, wherein, said handover request message carries an evolved Node Base station identifier, said evolved Node Base station includes a source evolved Node Base station or a target evolved Node Base station, said evolved Node Base station identifier is the same as a local packet data network gateway identifier;
obtaining the local breakout ability of said evolved Node Base station;
according to said evolved Node Base station identifier, the local breakout ability of said evolved Node Base station and a local IP access point name, establishing or modifying a local IP access bearer between a serving gateway and the local packet data network gateway, wherein said serving gateway is located in a core network or the evolved Node Base station,
wherein, before receiving the handover request message transmitted from said evolved Node Base station, the method further comprises a procedure of establishing a local IP access bearer, said establishing a local IP access bearer particularly comprises:
selecting the local packet data network gateway and the serving gateway, according to the local IP access point name and the home base station identifier;
sending a create or modify bearer request message to said serving gateway;
receiving a create or modify bearer response message returned from said serving gateway, and completing the procedure of establishing or modifying bearer between said serving gateway and the local packet data network gateway,
wherein, before selecting the local packet data network gateway and the serving gateway according to the local IP access point name and the home base station identifier, the method further comprises:
according to said local IP access point name and said base station identifier, selecting the serving gateway and the local packet data network gateway, and sending the create or modify bearer request message to said serving gateway;
receiving the create or modify bearer response message returned from said serving gateway, and completing the procedure of establishing or modifying a local IP access bearer between said serving gateway and said local packet data network gateway.

* * * * *